US006334665B1

(12) United States Patent
Yoshida

(10) Patent No.: US 6,334,665 B1
(45) Date of Patent: *Jan. 1, 2002

(54) PRINTING SYSTEM AND METHOD OF PRINTING

(75) Inventor: Masahiko Yoshida, Nagano-ken (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,320

(22) Filed: May 8, 1998

(30) Foreign Application Priority Data

May 14, 1997 (JP) ............................... 9-124577
Apr. 8, 1998 (JP) ............................. 10-114202

(51) Int. Cl.⁷ .................................. B41J 2/21
(52) U.S. Cl. ............................ 347/40; 347/12; 347/43
(58) Field of Search ......................... 347/40, 41, 43, 347/12, 15, 9; 358/1.8, 502

(56) References Cited

U.S. PATENT DOCUMENTS

| | | | |
|---|---|---|---|
| 4,069,486 A | | 1/1978 | Fox ............................... 347/41 |
| 4,198,642 A | | 4/1980 | Gamblin ...................... 347/41 |
| 4,540,996 A | * | 9/1985 | Saito ........................... 347/43 |
| 4,748,453 A | * | 5/1988 | Lin et al. ...................... 347/43 |
| 4,967,203 A | * | 10/1990 | Doan et al. .................... 347/43 |
| 5,327,166 A | * | 7/1994 | Shimada ....................... 347/43 |
| 5,583,550 A | * | 12/1996 | Hickman et al. ............. 347/40 |
| 5,844,585 A | * | 12/1998 | Kurashima et al. ........... 347/43 |

FOREIGN PATENT DOCUMENTS

| | | | |
|---|---|---|---|
| EP | 0 600 707 A1 | 6/1994 | |
| EP | 0 800 923 A2 | 10/1997 | |
| JP | 359089160 | * 5/1984 | .................. 347/43 |
| JP | 3-207665 | 9/1991 | |
| JP | 4-19030 | 3/1992 | |

* cited by examiner

Primary Examiner—N. Le
Assistant Examiner—Lamson D. Nguyen
(74) Attorney, Agent, or Firm—Oblon, Spivak, McClelland, Maier & Neustadt, P.C.

(57) ABSTRACT

The present invention prevents deterioration of the picture quality due to a deviation of dot-forming positions on each raster line without lowering the printing speed. In a printing system of the present invention, a print head of each color has a plurality of nozzle groups arranged in parallel in a main scanning direction. The number of nozzle groups is equal to N1 and each nozzle group includes a plurality of nozzles aligned in a sub-scanning direction. An interval between the adjoining nozzle groups in the main scanning direction is set equal to a pitch of k1 dots, which is prime to the number of nozzle groups N1. The printing system of the present invention scans the print head thus constructed in the main scanning direction and drives the plurality of nozzle groups simultaneously on the print head to record dots every time when the print head shifts by N1 pixels in the main scanning direction. This structure enables each raster line in the main scanning direction to be recorded by different nozzles in one main scan. This causes a deviation of dot-forming positions due to a distribution of ink-spouting characteristics of the individual nozzles to be effectively dispersed on each raster line and thereby improves the picture quality of a resulting printed image. The structure does not increase the number of main scans required to form each raster line, thus not lowering the printing speed.

9 Claims, 15 Drawing Sheets

PRINTING SYSTEM AND METHOD OF PRINTING

BACKGROUND OF THE INVENTION

1. Field of the Invention

The present invention relates to a printing system with a print head that carries out scans on a printing medium to implement printing. More specifically the present invention pertains to a technique of improving the picture quality of a resulting recorded image in such a printing system.

2. Description of the Related Art

The 'interlace printing method' disclosed in U.S. Pat. No. 4,198,642 is a proposed technique that improves the picture quality of a resulting printed image in a printer, such as a serial ink jet printer, in which a print head carries out main scans and sub-scans on a printing medium to implement printing. FIG. 23 illustrates an exemplified process of interlace printing. A variety of parameters are used in the following description. In the example of FIG. 23, it is assumed that a number of nozzles N that are actually used for formation of dots is equal to three. A nozzle pitch k [dots] represents an interval between centers of adjoining nozzles on the print head, which is expressed by a pitch of pixels in a recorded image (dot pitch w) as the unit. In the example of FIG. 23, k is equal to two. L denotes a feeding amount of the sheet of paper in sub-scan and is set equal to three raster lines in the example of FIG. 23.

In the drawing of FIG. 23, circles, each including a number of two figures, represent the recording positions of the respective dots. In the encircled number of two figures, the left-side figure represents the nozzle number and the right-side figure represents the recording sequence (which time of main scan the dot is recorded).

In the process of interlace printing shown in FIG. 23, the first main scan causes a second nozzle and a third nozzle to record dots on the respective raster lines, whereas no dots are formed by a first nozzle. After the sheet of paper is fed by the amount corresponding to three raster lines as shown in FIG. 23, the second main scan is carried out to form raster lines with the first through the third nozzles. The step of feeding the sheet of paper by the amount corresponding to three raster lines and the step of carrying out a main scan to form raster lines are repeated to record an image. The first main scan does not cause the first nozzle to form any raster line, since the second and the subsequent main scans do not form an adjoining raster line immediately below the imaginary raster line formed by the first nozzle in the first main scan.

The interlace printing forms raster lines intermittently in the sub-scanning direction in the above manner to record an image. Although FIG. 23 refers to the specific nozzle pitch, a variety of values may be set to the feeding amount L according to the nozzle pitch k and the number of nozzles N to realize the interlace printing. In general, the interlace printing process is characterized by the arrangement of a nozzle array on the print head and the method of sub-scans. The nozzle array includes N nozzles aligned in the sub-scanning direction. When the interval between the centers of adjoining nozzles is set equal to k times the pitch of pixels, N and k should be integers that are prime to each other. The feeding amount L in sub-scan carried out after each main scan is set equal to N times the pitch of pixels.

The interlace printing has an advantage of dispersing a deviation of dot-forming positions of dots due to the distributions of the positional accuracy of nozzles and the ink-spouting characteristics on a resulting recorded image. The interlace printing method accordingly reduces the effects of the distributions of the nozzle pitch and the ink-spouting characteristics and improves the picture quality of the resulting recorded image.

In the prior art technique of interlace printing, adjacent dots in the sub-scanning direction are recorded by different nozzles, whereas adjacent dots in the main scanning direction are recorded by an identical nozzle. There may be a deviation of dot-forming positions in the whole raster due to a distribution of ink-spouting characteristics of the individual nozzles. This may result in deteriorating the picture quality. A similar problem arises in the case of non-interlace printing.

In order to cancel the deviation of dot-forming positions in the whole raster and improve the picture quality of the resulting recorded image, the overlap printing technique may be adopted (for example, JAPANESE PATENT LAYING-OPEN GAZETTE No. 3-207665 and JAPANESE PATENT PUBLICATION GAZETTE No. 4-19030). The overlap printing process causes each raster line to be formed by different nozzles in two or more main scans. By way of example, when each raster line is formed by two main scans, the first main scan records dots only in pixels of odd ordinal numbers, which are allocated from one end of the raster line, by one nozzle. After a sub-scan, the second main scan records dots in pixels of even ordinal numbers on the raster line by a different nozzle.

Application of the overlap printing technique prevents a deviation of dot-forming positions in the whole raster and improves the picture quality of the resulting recorded image. The overlap printing process, however, requires two or more main scans to form each raster line and accordingly causes another problem, that is, lowering the printing speed.

A printer recently proposed records dots in each pixel in an overlapping manner and thereby increases the number of expressible tones in each pixel. In this printer, two or more main scans are also required to record dots in an overlapping manner and complete each raster line. This also causes a decrease in printing speed.

SUMMARY OF THE INVENTION

One object of the present invention is thus to provide a technique of preventing a deviation of dot-forming positions on each raster line without lowering the printing speed, so as to improve the picture quality of a resulting recorded image.

Another object of the present invention is to provide a technique of improving the printing speed in a printing system that records dots in an overlapping manner.

At least part of the above and the other related objects is realized by a printing system that carries out a main scan, which reciprocates a print head relative to a printing medium, and forms a raster line, which is a row of dots aligned in a main scanning direction, so as to print an image on the printing medium, wherein the print head has a plurality of nozzles which form an identical type of dots on a raster line in one main scan.

In the printing system of the present invention, dots are recorded by different nozzles on each of at least part of raster lines in the course of one main scan. This structure enables a deviation of dot-forming positions due to a distribution of the characteristics of the individual nozzles to be effectively dispersed on each raster line and thereby improves the picture quality of a resulting recorded image. The structure attains this effect without increasing the number of main scans required to form each raster line. The printing system of the present invention thus improves the picture quality of the resulting recorded image without lowering the printing speed.

In accordance with one application of the printing system, a plurality of dots may be recorded in each pixel on a raster line by a plurality of nozzles in the course of one main scan. Application of the above structure to the printing system that records dots in each pixel in an overlapping manner improves the printing speed while increasing the number of expressible tones in each pixel to enhance the picture quality.

In accordance with one preferable application of the present invention, the plurality of nozzles are arranged at a predetermined interval k1 in the main scanning direction, the predetermined interval being an integral multiple of a pitch of pixels in the main scanning direction.

In the printing system of this preferable structure, all the nozzles can record dots in the respective pixels at an identical drive timing. The structure of setting an identical drive timing to all the nozzles and controlling the on-off state of each nozzle enables dots to be recorded in arbitrary pixels. This structure simplifies a driving circuit or a driving mechanism for driving the respective nozzles.

In accordance with another preferable application of the present invention, the printing system further includes a drive unit which controls actuation of the plurality of nozzles and causes the plurality of nozzles to record dots at different positions on the raster line.

In the printing system of this preferable structure, dots can be recorded at different positions on each raster line by the plurality of nozzles. This structure enables a deviation of dot-forming positions to be effectively dispersed on each raster line and thereby improves the picture quality of the resulting recorded image. The driving unit may drive the respective nozzles at different timings or alternatively at an identical timing.

In the printing system of this structure, it is preferable that the plurality of nozzles are arranged to satisfy a relationship in which the predetermined interval k1 of the plurality of nozzles in the main scanning direction expressed as the pitch of pixels in the main scanning direction is prime to a number of the plurality of nozzles N1 aligned in the main scanning direction.

In this structure, it is further preferable that the drive unit drives the plurality of nozzles simultaneously at a specific timing to record dots in every N1-th pixel in the main scanning direction.

In the printing system of this structure, the respective nozzles are set to the ON state simultaneously at predetermined intervals, that is, at the intervals of recording dots by every shift of N1 dots in the main scanning direction. This structure enables dots to be recorded in different pixels. This structure facilitates the control for dot formation and simplifies the structure of the driving circuit for driving the nozzles.

This effect will be described more concretely. FIG. 11 illustrates the process of recording dots with the print head having two nozzle groups, that is, nozzle groups A and B. Since the print head has two nozzle groups, N1 is equal to two. The interval between the nozzle groups A and B in the main scanning direction corresponds to three dots; that is, k1=3. In this example, N1 and k1 are prime to each other. The dots formed by the print head are shown by the open circles and the open squares in FIG. 11. The open circles represent dots formed by the nozzle group A, whereas the open squares represent dots formed by the nozzle group B.

FIG. 12 illustrates the process of recording dots at the time point when the print head shifts in the main scanning direction by N1 dots (two dots in this example). As shown in FIG. 12, the structure of the printing system enables dots to be recorded in new pixels where no dots have been recorded previously. FIGS. 13 and 14 illustrate the process of recording dots at the time points when the print head further shifts in the main scanning direction. As shown in FIGS. 13 and 14, the structure enables dots to be recorded in new pixels where no dots have been recorded previously.

The above example regards the case of N1=2 and k1=3. The similar effects can be exerted as long as the number of nozzles N1 and the interval k1 between the adjoining nozzles in the main scanning direction are prime to each other.

In accordance with still another preferable application of the present invention, the print head has plural sets of the plurality of nozzles, the plural sets being arranged at a given interval in a predetermined direction crossing the main scanning direction, the given interval being an integral multiple k2 of a pitch of pixels in the predetermined direction.

The printing system of this preferable structure enables a plurality of raster lines to be formed simultaneously, thereby improving the printing speed. In another aspect, this preferable structure implies a plurality of nozzle groups aligned in the main scanning direction, each group including the plurality of nozzles arranged at a given interval in the predetermined direction crossing the main scanning direction. The given interval is an integral multiple of the pitch of pixels in the predetermined direction. By way of example, the print head may have a plurality of nozzle groups A and B arranged in a main-scanning direction as shown in FIG. 11. In accordance with one modification, part of the nozzle groups may consist of only one nozzle. The printing system described above includes both type of system that carries out the other scanning and not.

In the printing system of this preferable structure, it is preferable that the print head has the plural sets of the plurality of nozzles that are arranged to satisfy a relationship in which the integral multiple k2 and a number of the plural sets N2 are prime to each other.

In accordance with one application of this structure, the printing system further includes a sub-scanning unit that carries out a sub-scan, which shifts the printing medium relative to the print head by a predetermined amount of feed in a sub-scanning direction or in the predetermined direction crossing the main scanning direction every time when one raster line is formed, the predetermined amount of feed is N2 times the pitch of pixels in the sub-scanning direction.

The printing system of this structure realizes interlace printing. The interlace printing enables a deviation of dot-forming positions due to a distribution of the characteristics of the individual nozzles to be effectively dispersed on each raster line as well as among different raster lines, thereby further improving the picture quality of the resulting recorded image.

The present invention is also directed to a method of carrying out a main scan, which reciprocates a print head relative to a printing medium, and forming a raster line, which is a row of dots aligned in a main scanning direction, so as to print an image on the printing medium, wherein the print head has a plurality of nozzles which form an identical type of dots on a raster line in one main scan and are arranged to satisfy a relationship in which a predetermined interval k1 of the plurality of nozzles in the main scanning direction expressed as a pitch of pixels in the main scanning direction is prime to a number of the plurality of nozzles N1 aligned in the main scanning direction, the method including the steps of:

(a) driving the print head in the main scanning direction; and (b) driving the plurality of nozzles simultaneously at a specific timing to record dots in every N1-th pixel in the main scanning direction.

As discussed previously in the printing system of the present invention, this method enables the respective raster lines to be formed by different nozzles, thereby improving the picture quality of a resulting recorded image. This method also enables the control for that purpose to be readily realized.

These and other objects, features, aspects, and advantages of the present invention will become more apparent from the following detailed description of the preferred embodiments with the accompanying drawings.

BRIEF DESCRIPTION OF THE DRAWINGS

FIG. 4 schematically illustrates internal structure of the print head 17a;

FIG. 7 is an enlarged view of the print head 17a;

FIG. 9 shows the process of transmitting signals for forming dots to the print head 17a;

DESCRIPTION OF THE PREFERRED EMBODIMENTS

Some modes of carrying out the present invention are discussed below as preferred embodiments.

(1) Structure of Apparatus

Figure 1:
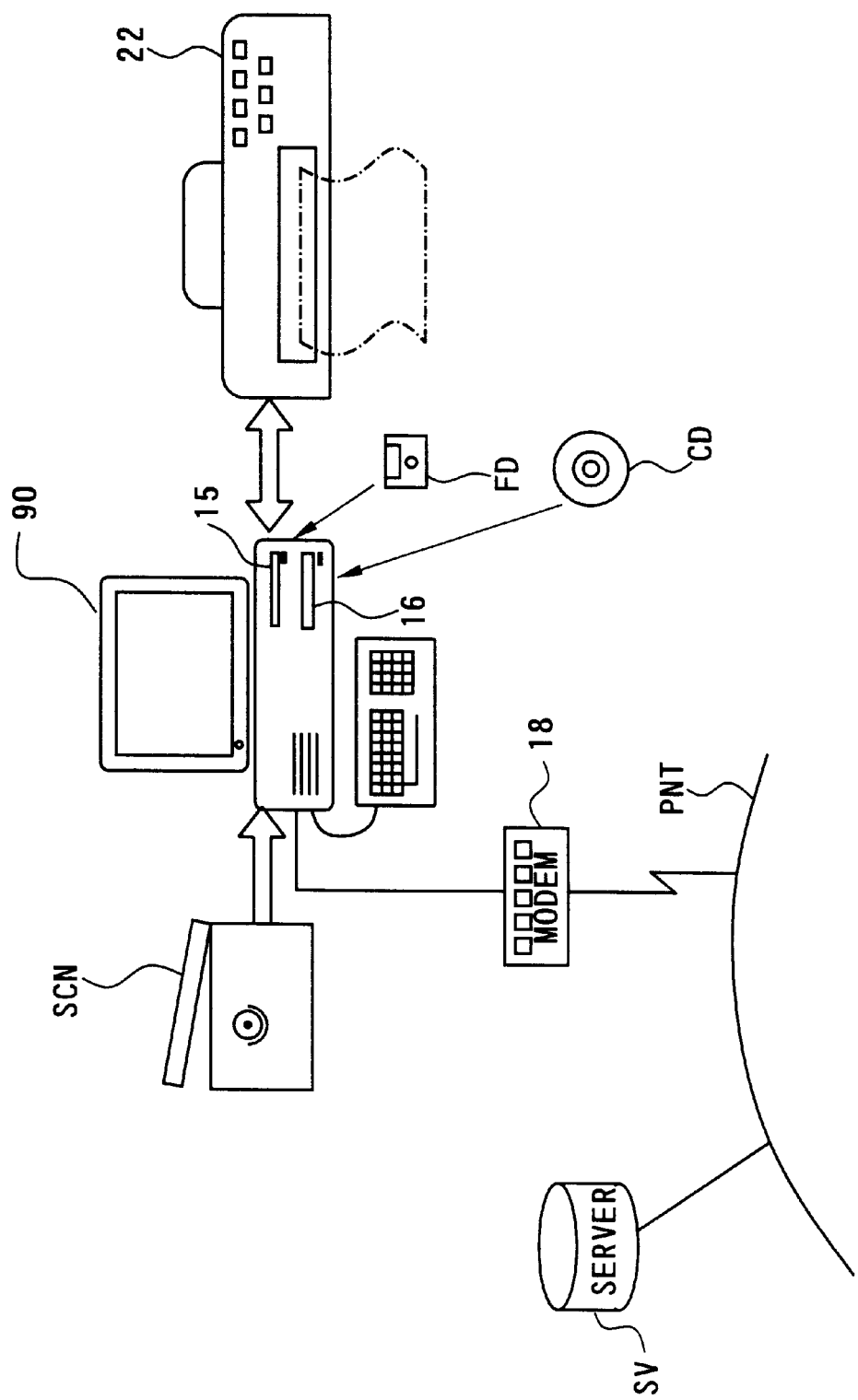
FIG. 1 is a block diagram schematically illustrating structure of an image processing apparatus with a color printer 22 as one embodiment of a printing system of the present invention.

FIG. 1 is a block diagram schematically illustrating structure of an image processing apparatus with a color printer 22 as one embodiment of a printing system of the present invention. Referring to FIG. 1, a scanner SCN and the color printer 22 are connected to a computer 90. The computer 90 processes images input, for example, from the scanner SCN according to a variety of applications programs. When an applications program outputs an instruction to print an image, the computer 90 activates a printer driver incorporated therein to convert the input image data to print data that are printable by the printer 22, and output the converted print data to the printer 22. The printer 22 receives the output print data and prints an image while executing a variety of controls discussed later. The printer 22 of this embodiment carries out printing in a variety of print modes. Data transferred from the computer 90 to the printer 22 include data used for specifying a print mode.

The computer 90 includes a flexible disk drive 15 and a CD-ROM drive 16, which respectively read programs recorded on a flexible disk FD and a CD-ROM. The computer 90 is connectable with a public telephone network PNT via a modem 18. The computer 90 connects with a specific server SV linked with an external network via the public telephone network PNT and downloads programs into a hard disk incorporated in the computer 90. The computer 90 may transfer a variety of data as well as the downloaded programs to the printer 22.

Figure 2:
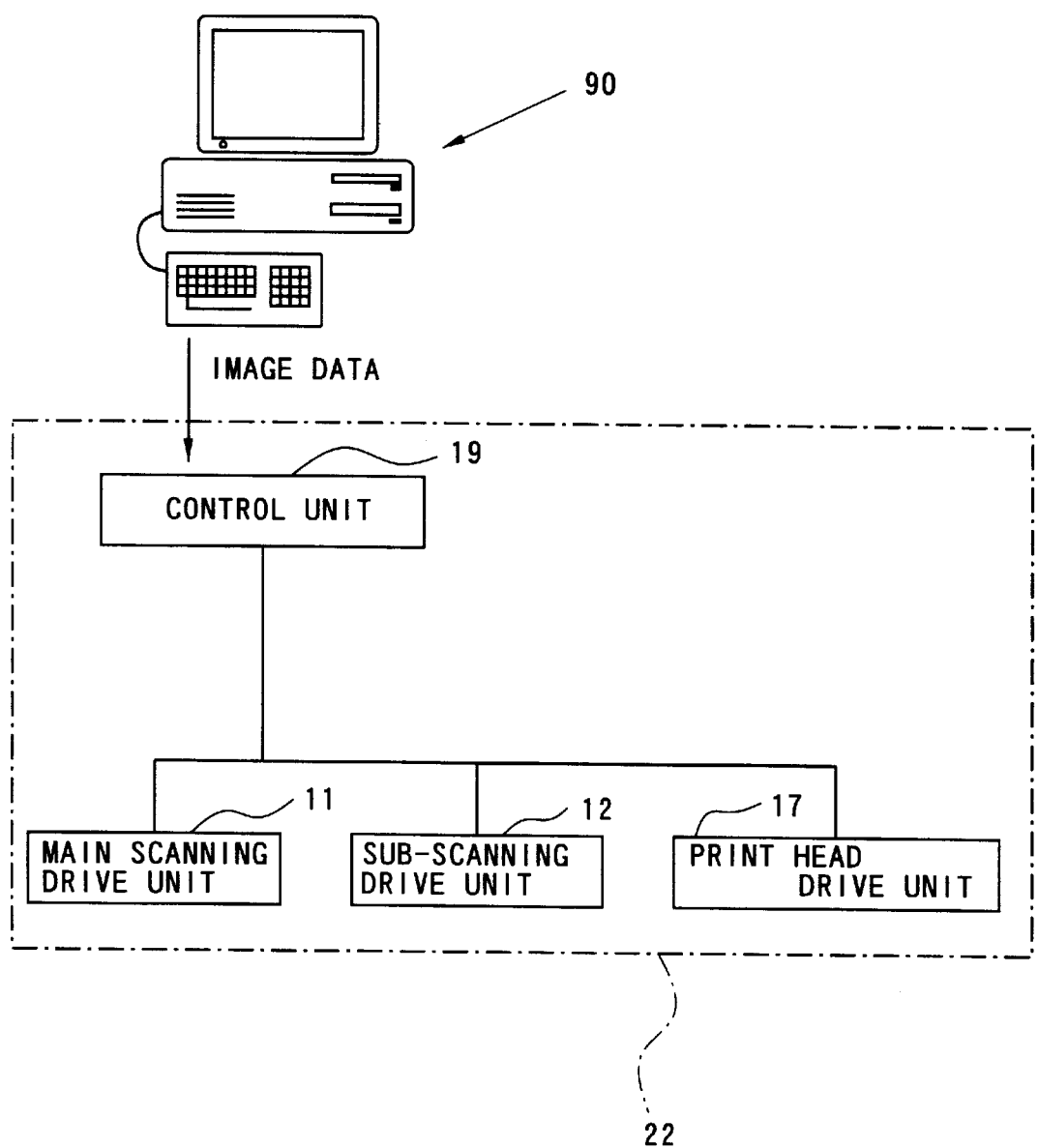
FIG. 2 is a block diagram illustrating software structure of this embodiment.

FIG. 2 is a block diagram illustrating software structure of this embodiment. The printer 22 includes a print head drive unit 17, a main scanning drive unit 11, a sub-scanning drive unit 12, and a control unit 19 including a CPU, a RAM, and a ROM. The main scanning drive unit 11 carries out main scans that reciprocate a print head in a main scanning direction, whereas the sub-scanning drive unit 12 feeds a sheet of paper in a sub-scanning direction that is perpendicular to the main scanning direction. The print head drive unit 17 drives a plurality of nozzles disposed on the print head, based on the print data transferred from the computer 90, and causes ink to spout onto the sheet of paper and record an image. The control unit 19 controls the operations of these units 17, 11, and 12.

Figure 3:
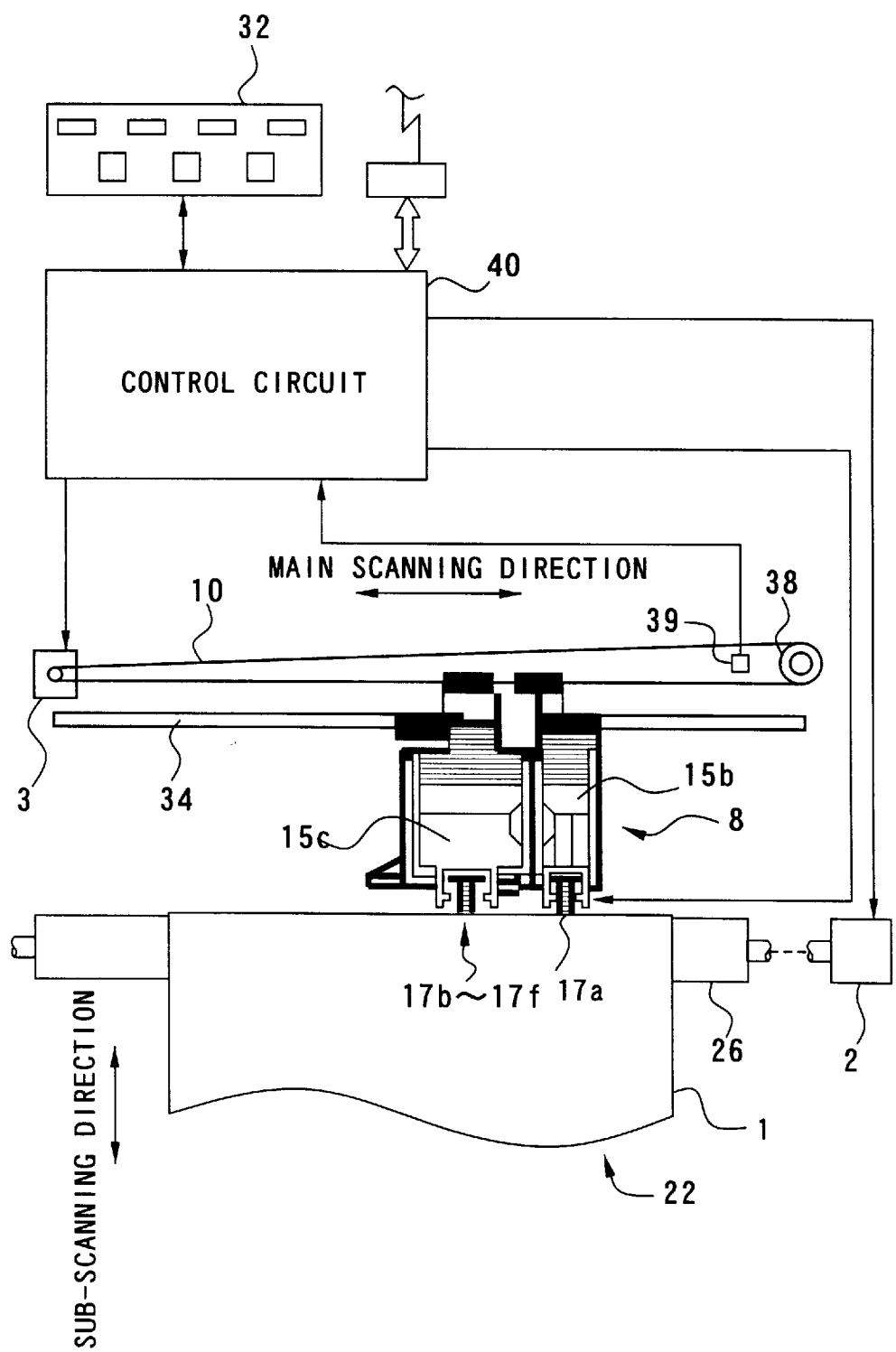
FIG. 3 schematically illustrates structure of the printer 22.

FIG. 3 schematically illustrates structure of the printer 22. The printer 22 has a mechanism for feeding a printing medium 1 by means of a sub-scanning motor 2, a mechanism for reciprocating a carriage 8 along the axis of a platen 26 by means of a main scanning motor 3, a mechanism for driving print heads 17a through 17f mounted on the carriage 8 to control spout of ink and formation of dots, and a control circuit 40 for transmitting signals to and from the sub-scanning motor 2, the main scanning motor 3, the print heads 17a through 17f, and a control panel 32. The following describes these mechanisms in this sequence.

The printing medium 1, such as a sheet of paper or a film, is fed in the sub-scanning direction by means of a drive roller driven by the sub-scanning motor 2 and a pressure roller. The sub-scanning direction is perpendicular to the direction in which the carriage 8 reciprocates as shown in FIG. 3.

The mechanism for reciprocating the carriage 8 along the axis of the platen 26 includes a sliding shaft 34 that is arranged in parallel with the axis of the platen 26 to slidably support the carriage 8, a pulley 38, an endless drive belt 10 spanned between the main scanning motor 3 and the pulley 38, and a position sensor 39 that detects the position of the origin of the carriage 8. The main scanning motor 3 drives the drive belt 10 and reciprocates the carriage 8 in the main scanning direction.

A black ink tank 15b for black ink (Bk) and a color ink tank 15c in which five color inks, that is, cyan (C1), light cyan (C2), magenta (M1), light magenta (M2), and yellow (Y), are accommodated may be mounted on the carriage 8 of the printer 22. Both the higher-density ink (dark ink) and the lower-density ink (light ink) are provided for the two colors, cyan and magenta. The total of six print heads 17a through 17f are mounted on the lower portion of the carriage 8, and ink supply conduits 16 (see FIG. 4) are formed in the bottom portion of the carriage 8 for leading supplies of inks from the ink tanks 15b and 15c to the respective print heads 17a through 17f. When the black ink tank 15b and the color ink tank 15c are attached downward to the carriage 8, the ink supply conduits 16 are inserted into connection apertures (not shown) formed in the respective ink tanks. This enables supplies of inks to be fed from the respective ink tanks 15b and 15c to the print heads 17a through 17f.

Figure 4:
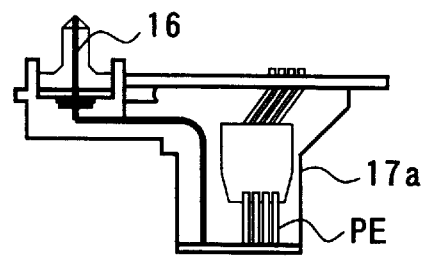
Figure 4:
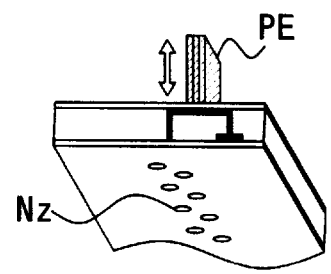

The following describes the mechanism of spouting ink and forming dots. FIG. 4 schematically illustrates internal structure of the print head 17a. When the ink tank 15b is attached to the carriage 8, a supply of ink in the ink tank 15b is sucked out by capillarity through the ink supply conduit 16 and is led to the print head 17a as shown in FIG. 4. In case that the ink tank 15b is attached to the carriage 8 for the first time, a pump works to suck a first supply of ink into the print head 17a. In this embodiment, structures of the pump for suction and a cap for covering the print head 17a during the suction are not illustrated nor described specifically. The other print heads 17b through 17f have similar structures.

Figure 5:
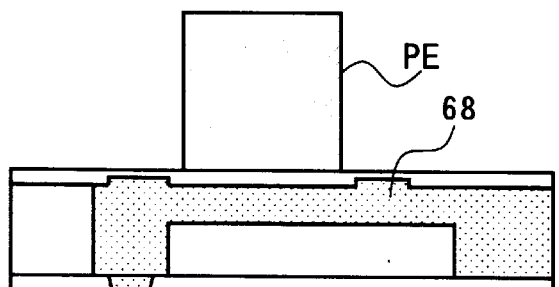
FIG. 5 illustrates the principle of formation of dots in the printer 22 of the embodiment.
Figure 5:
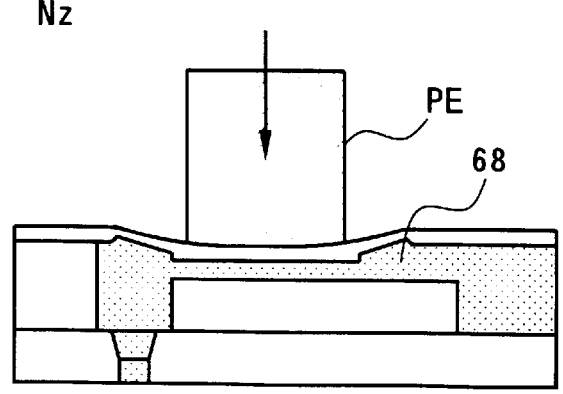

An array of forty-eight nozzles Nz (see FIG. 6) are formed in each of the print heads 17a through 17f of the respective colors as discussed later. A piezoelectric element PE, which is one of electrically distorting elements and has an excellent response, is arranged for each nozzle Nz. FIG. 5 illustrates a configuration of the piezoelectric element PE and the nozzle Nz. As shown in the upper drawing of FIG. 5, the piezoelectric element PE is disposed at a position that comes into contact with an ink conduit 68 for leading ink to the nozzle Nz. As is known, the piezoelectric element PE has a crystal structure that is subjected to mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 68 as shown in the lower drawing of FIG. 5. The volume of the ink conduit 68 is reduced with an extension of the piezoelectric element PE, and a certain amount of ink corresponding to the reduced volume is sprayed as ink particles Ip from the end of the nozzle Nz at a high speed. The ink particles Ip soak into the printing medium 1 set on the platen 26, so as to implement printing.

Figure 6:
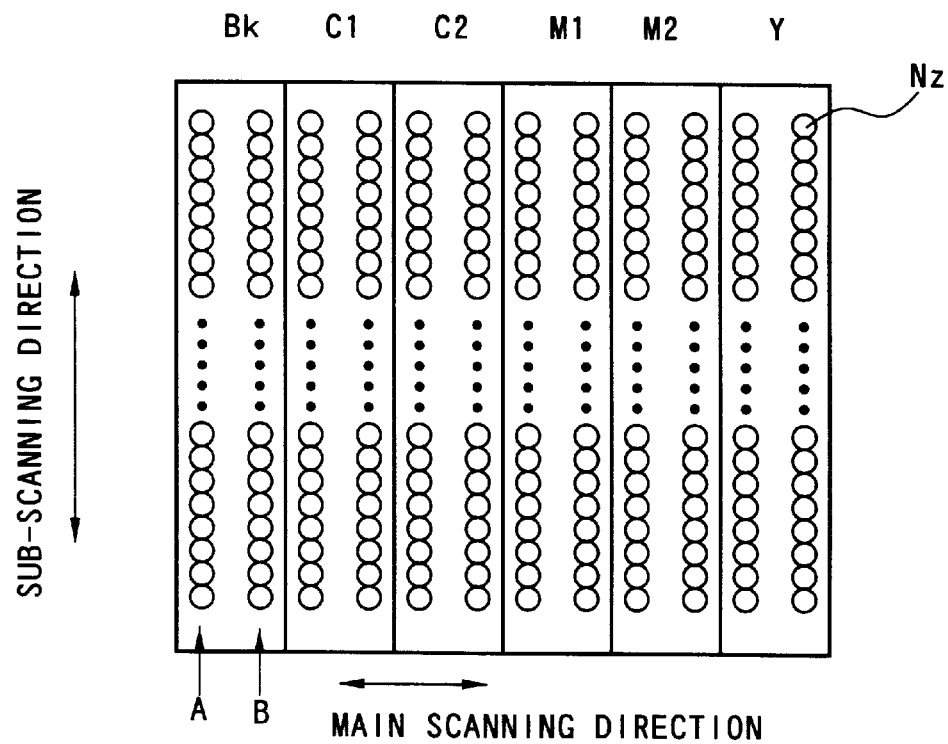
FIG. 6 shows an arrangement of ink jet nozzles Nz on the print heads 17a through 17f.

FIG. 6 shows an arrangement of the ink jet nozzles Nz on the print heads 17a through 17f. The arrangement includes six nozzle arrays, wherein each nozzle array has a plurality of nozzles that spray ink particles of each color on the printing medium 1. Each nozzle array includes forty-eight nozzles Nz arranged linearly in two columns. For convenience of explanation, one column of nozzles linearly arranged is referred to as the nozzle group A, whereas the other column of nozzles is referred to as the nozzle group B.

Figure 7:
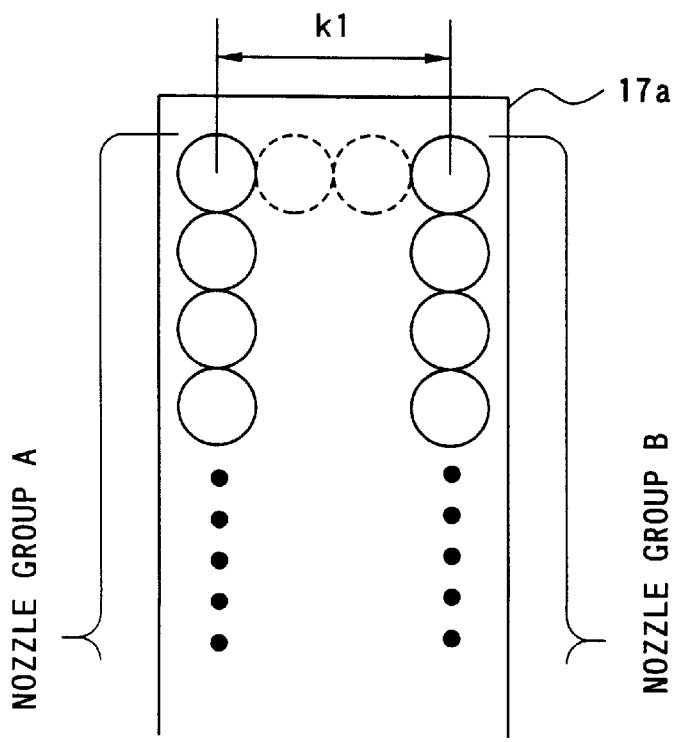

FIG. 7 is an enlarged view of the print head 17a. The nozzle group A and the nozzle groups B respectively includes twenty-four nozzles aligned in the sub-scanning direction. The interval between each pair of adjoining nozzles in the sub-scanning direction is identical with the recording pitch of dots in the sub-scanning direction. The corresponding nozzles in the nozzle group A and the nozzle group B have coincident positions in the sub-scanning direction. An interval k1 between the nozzle group A and the nozzle group B in the main scanning direction is set in such a manner that a number of nozzle groups N1 is prime to the interval k1 between the nozzle groups A and B in the main scanning direction expressed by the recording pitch of dots in the main scanning direction as the unit. In this embodiment, the print head 17a has two nozzle groups, that is, the nozzle group A and the nozzle group B. The number of nozzle groups N1 is accordingly equal to two. An odd number is accordingly set to the interval k1 between the nozzle groups A and B in the main scanning direction. As shown in FIG. 7, the interval k1 is set equal to the pitch of three dots in this embodiment. The circles shown by the broken line in FIG. 7 represent the size of dots recorded in the main scanning direction. Another odd number may be set to the interval k1 between the adjoining nozzle groups in the main scanning direction. The reason why the interval k1 between the nozzle groups in the main scanning direction is set to be prime to the number of nozzle groups N1 will be discussed later, with the process of recording dots in this embodiment. The other print heads 17b through 17f have similar structures.

Figure 8:
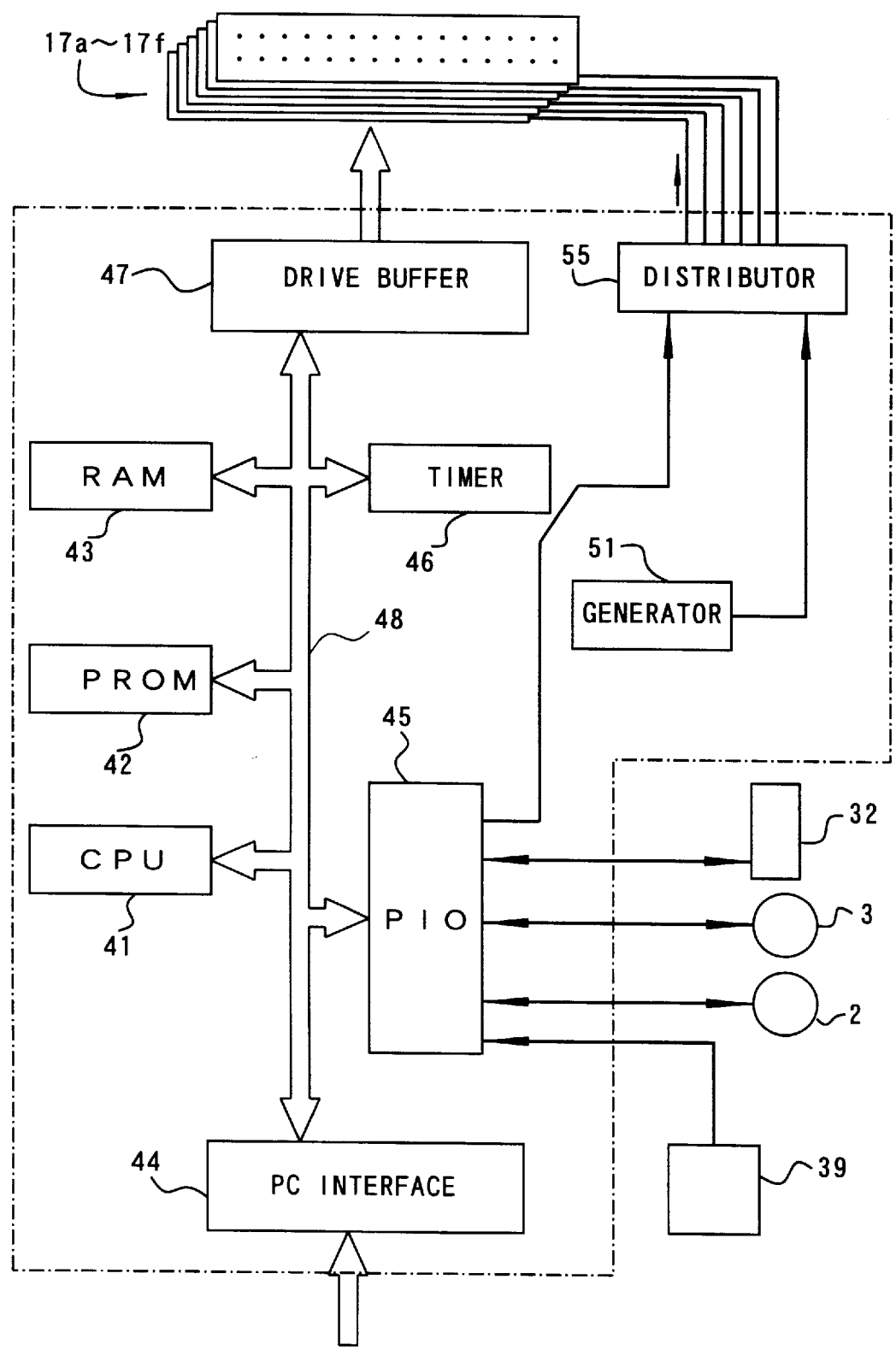
FIG. 8 illustrates internal structure of the control circuit 40 of the printer 22.

The following describes the internal structure of the control circuit 40 of the printer 22 and the method of driving the print heads 17a through 17f with the plurality of nozzles Nz shown in FIG. 6. FIG. 8 illustrates internal structure of the control circuit 40. Referring to FIG. 8, the control circuit 40 includes a CPU 41, a PROM 42, a RAM 43, a PC interface 44 that transfers data to and from the computer 90, a peripheral input-output unit (PIO) 45 that transmits signals to and from the sub-scanning motor 2, the main scanning motor 3, and the control panel 32, a timer 46 that counts the time, and a drive buffer 47 that outputs dot on-off signals to the print heads 17a through 17f. These elements and circuits are mutually connected via a bus 48.

The control circuit 40 also includes a generator 51 that outputs driving waveforms (see FIG. 9) at a predetermined frequency and a distributor 55 that distributes the output from the generator 51 to the print heads 17a through 17f at a preset timing. The control circuit 40 receives the image data processed by the computer 90, temporarily stores the input image data into the RAM 43, and outputs the image data to the drive buffer 47 at a predetermined timing. The control circuit 40 also controls main scans of the carriage 8, actuation of the respective nozzles, and sub-scans.

Figure 9:
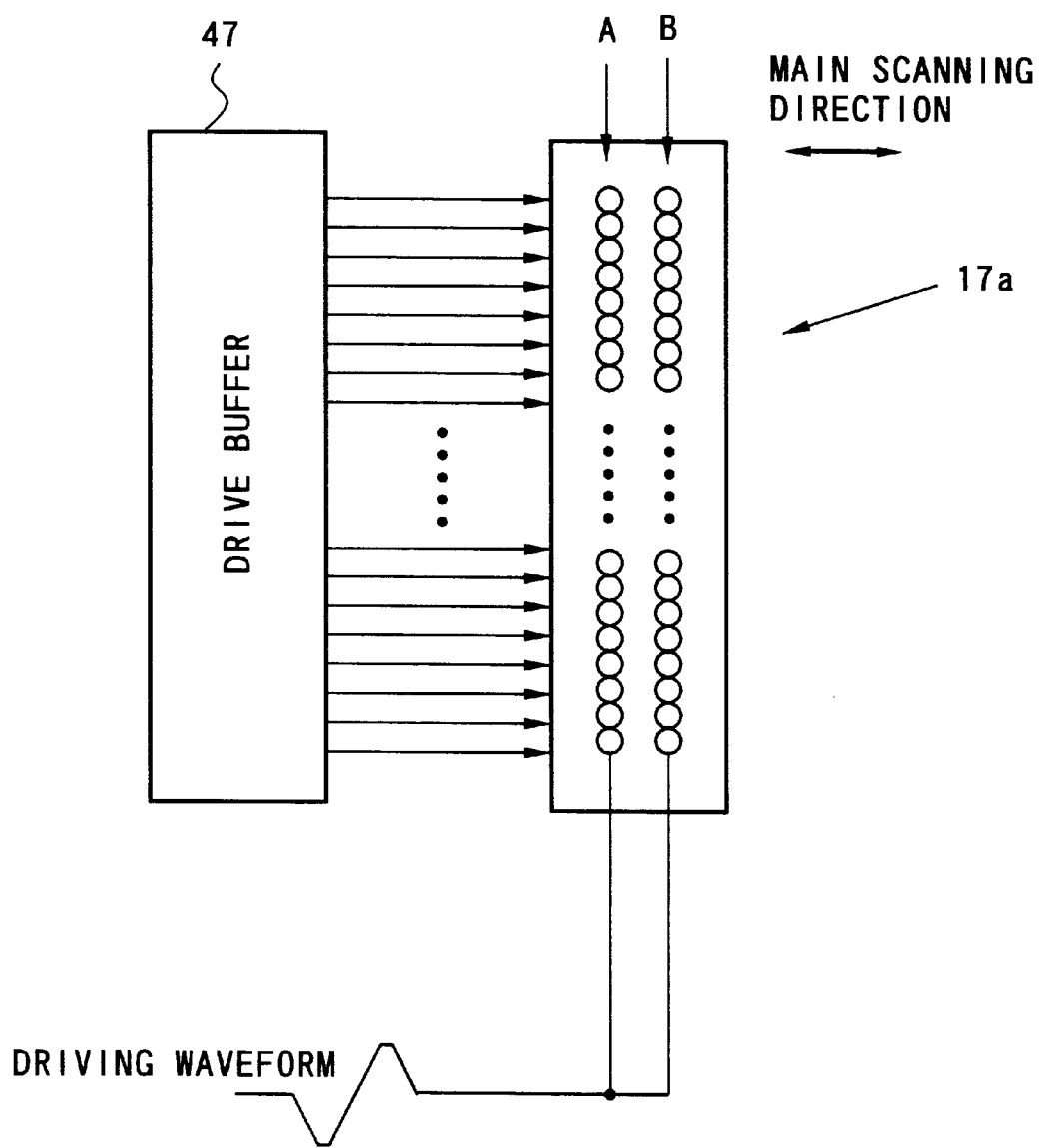

The control circuit 40 outputs signals to the respective print heads 17a through 17f in the following manner. FIG. 9 shows a process of transmitting signals for forming dots to the print head 17a as an example. The respective nozzles groups A and B on the print head 17a are incorporated in a circuit with the drive buffer 47 as the source and the distributor 55 as the sink. Each piezoelectric element PE used for driving each nozzle has one electrode connected to each output terminal of the drive buffer 47 and the other electrode connected to a common output terminal of the distributor 55. The distributor 55 outputs driving waveforms of the generator 51 to the nozzle groups A and B as shown in FIG. 9. When the CPU 41 determines the on-off state of the respective nozzles and outputs signals to the corresponding terminals of the drive buffer 47, only the piezoelectric elements PE receiving the ON signal from the drive buffer 47 are driven according to the driving waveforms. This causes the nozzles corresponding to the piezoelectric elements PE receiving the ON signal from the drive buffer 47 to spout ink particles Ip.

In the printer 22 having the hardware structure described above, while the sub-scanning motor 2 feeds the printing medium 1, the main scanning motor 3 reciprocates the carriage 8. At the same time, the piezoelectric elements PE provided on the print heads 17a through 17f of the respective colors are driven to spout the respective color inks and form dots, thereby producing a multi-colored image on the printing medium 1.

The print heads 17a through 17f adopted in this embodiment utilize the piezoelectric elements that vibrate to apply a pressure to ink and cause the ink to be sprayed. The print heads 17a through 17f may, however, have any one of the other applicable structures, for example, the structure of heating ink with a heater to produce bubbles and causing ink to be sprayed by the expansion pressure. The principle of the present invention is applicable to a variety of printing systems, for example, printers whose print head is a thermal transfer mechanism or an impact dot mechanism, other than the printer whose print head is the ink jet mechanism discussed above.

(2) Print Control Process

Figure 10:
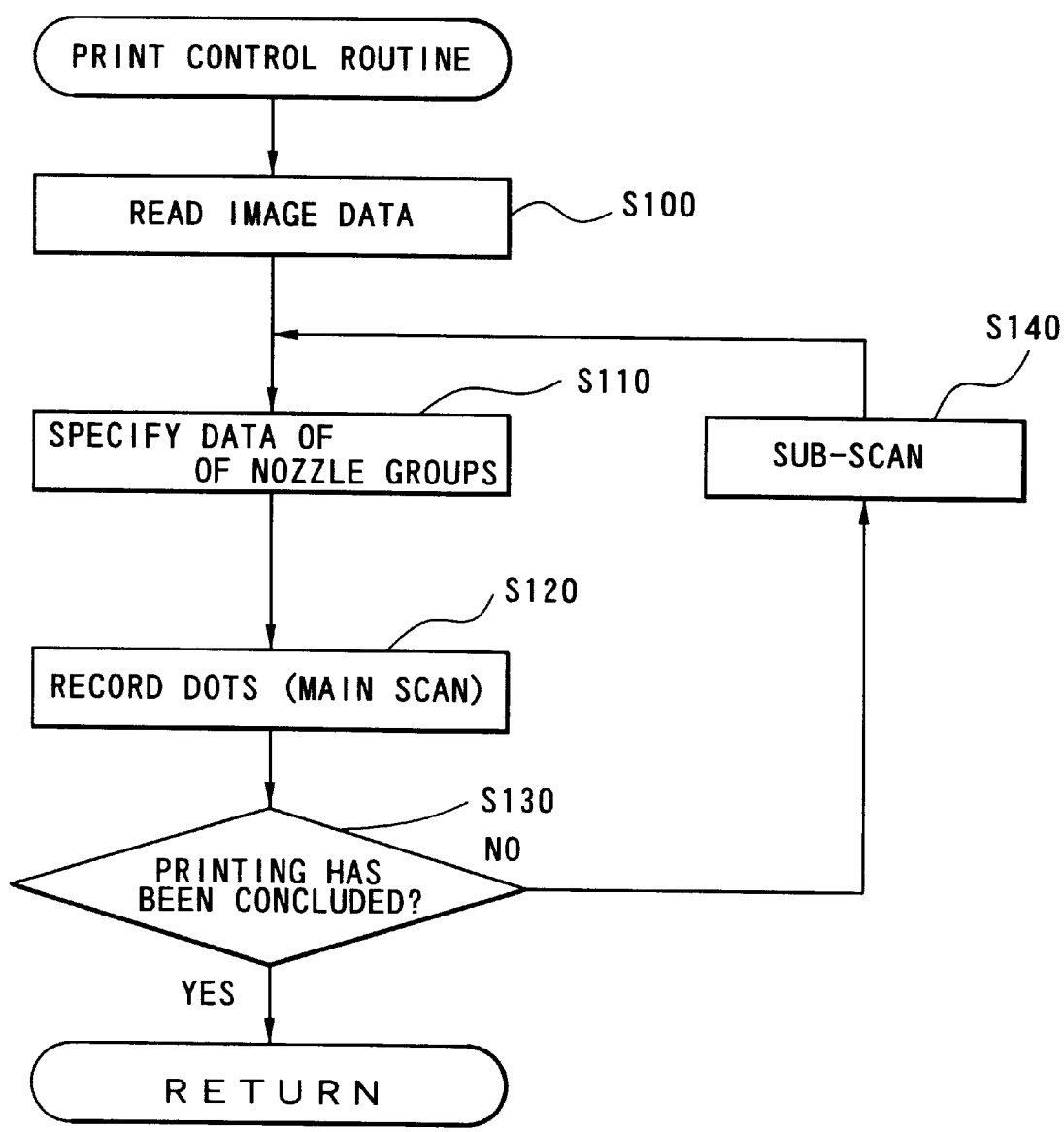
FIG. 10 is a flowchart showing the flow of a print control routine.

The following describes the details of a print control process, which forms dots and thereby prints an image, with the flowchart of FIG. 10. The flowchart of FIG. 10 shows the flow of a print control routine. This routine is executed by the CPU 41 of the printer 22 (see FIG. 8). When the program enters the print control routine, the CPU 41 first reads image data at step S100. The image data are a series of data that have been processed by the computer 90 and represent the on-off state of dots to cause the respective print heads 17a through 17f of the printer 22 to create raster lines. Although the structure of this embodiment first reads all the image data and then starts printing, another possible structure may successively read image data required for one main scan.

The CPU 41 then specifies data used for the respective nozzle groups to record dots at step S110. In this embodiment, each print head has two columns of nozzles that form dots on the respective raster lines as shown in FIG. 7, that is, the nozzle groups A and B described above. The CPU 41 accordingly allocates the dots to be formed on the respective raster lines to these nozzle groups A and B at step S110. A concrete procedure of allocating data to the nozzle groups will be discussed later. The specified data are transferred to the drive buffer 47 shown in FIG. 8.

The CPU 41 subsequently drives the main scanning motor 3 to carry out a main scan of the carriage 8 and drives the respective print heads 17a through 17f to record dots at step S120. The following describes the timing of the main scan and formation of dots with the drawings of FIGS. 11 through 14.

Figure 11:
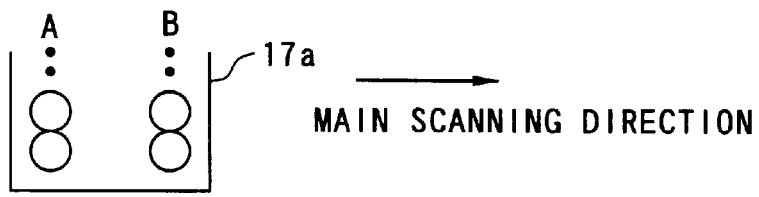
FIG. 11 illustrates the process of recording dots with the print head 17a of the first embodiment at a first timing.

FIG. 11 illustrates the position of the carriage 8 at the time of starting a main scan and the dots formed by the print head 17a. The carriage 8 carries out main scans in the lateral direction in the drawing of FIG. 11. The carriage 8 moves rightward in FIG. 11 to record dots. For convenience of explanation, it is assumed that the nozzles on the left side are included in the nozzle group A and the nozzles on the right side are included in the nozzle group B. The dots formed by the nozzle group A are shown by open circles, whereas the dots formed by the nozzle group B are shown by open squares. The numerals in the respective symbols imply that these dots are formed at the first timing. In this embodiment, the interval between the nozzle group A and the nozzle group B in the main scanning direction corresponds to three dots as shown in FIG. 7. The dots are accordingly formed at an interval of three dots in the main scanning direction as shown in FIG. 11. There are no dots formed to be adjacent in the main scanning direction to the imaginary dots formed by the nozzle group A at the timing of FIG. 11 as described later. In this embodiment, the nozzle group A accordingly does not form any dots at the first timing shown in FIG. 11. The dots corresponding to the nozzle group A are shown by the broken line in FIG. 11. This implies that no dots are actually formed by the nozzle group A at this timing.

As a matter of convenience of illustration, both the number of nozzles and the number of dots formed by the nozzles are reduced in the example of FIGS. 11 through 14. A total of forty-eight dots are formed in the actual state. Although FIGS. 11 through 14 illustrate only the print head 17a for printing black dots, the other print heads 17b through 17f form dots in a similar manner.

Figure 12:
FIG. 12 illustrates the process of recording dots with the print head 17a of the first embodiment at a second timing.

After formation of the dots at the first timing, the carriage 8 shifts rightward to cause the nozzle groups A and B to record dots at a second timing. FIG. 12 shows the position of the carriage 8 and the dots formed at this timing. At the second timing shown in FIG. 12, the dots are formed in pixels that are apart from the dots formed in FIG. 11 by two dots in the main scanning direction. This means that the moving rate of the print head 17a in the main scanning direction is N1 times the dot pitch in the main scanning direction per recording time of one dot. N1 denotes the number of nozzle groups provided on each print head. In this embodiment, there are two nozzle groups, the nozzle groups A and B, on each print head, so that N1 is equal to 2.

Figure 13:
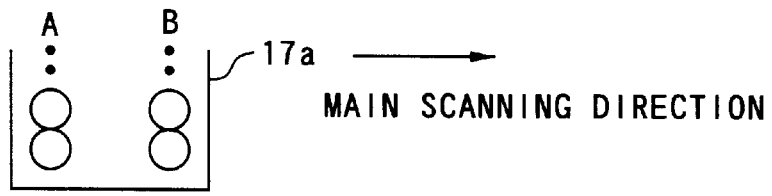
FIG. 13 illustrates the process of recording dots with the print head 17a of the first embodiment at a third timing.
Figure 14:
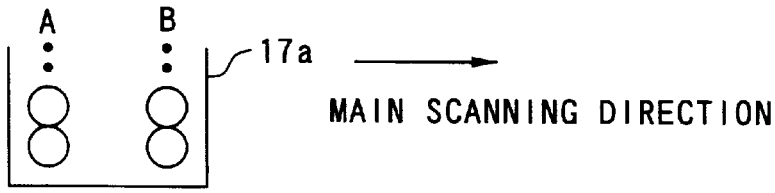
FIG. 14 illustrates the process of recording dots with the print head 17a of the first embodiment at a fourth timing.

The carriage 8 further shifts in the main scanning direction by two dots to cause the nozzle groups A and B to record dots at the timing shown in FIG. 13, then shifts by another two dots to cause the nozzle groups A and B to record dots at the timing shown in FIG. 14. Every time when the carriage 8 shifts by two dots, the nozzle groups A and B are activated to form dots simultaneously. This structure enables dots to be formed without causing any dropout or overlap of dots in the main scanning direction as shown in FIG. 14.

At step S110 in the flowchart of FIG. 10, image data corresponding to the respective raster lines are allocated to the nozzle groups A and B, in order to realize the recording process shown in FIGS. 11 through 14. The nozzle groups A and B respectively form dots in every other pixel in the main scanning direction as shown in FIGS. 11 through 14. Among the image data corresponding to the respective raster lines, data corresponding to pixels of odd ordinal numbers in the main scanning direction are allocated to the nozzle group B, whereas data corresponding to pixels of even ordinal numbers are allocated to the nozzle group A.

As discussed in FIG. 7, in this embodiment, the appropriate values are set to the interval k1 between the nozzle groups and the number of nozzle groups N1, in order to satisfy the relationship in which the interval k1 and the number N1 are prime to each other. This structure enables dots to be formed without any dropout in the main scanning direction while the carriage 8 shifts in the main scanning direction and drives both the nozzle groups at the same timing. This structure facilitates control of the respective print heads 17a through 17f and simplifies the circuit structure of the control circuit 40. In order to change the timing of dot formation in the respective nozzle groups, a delay circuit is generally required to output the driving waveforms of the generator 51 at different timings to the respective nozzle groups in the structure of FIG. 8. The delay circuit is, however, not required when the above condition regarding the number of nozzle groups and the interval between the nozzle groups is satisfied. The circuit structure is accordingly simplified in this embodiment as shown in FIG. 9. The nozzle groups may be arranged at the interval that does not satisfy the above condition as long as the structure allows control of the print head and adjustment of the output timing of the driving waveforms.

The above procedure forms the respective raster lines. Referring back to the flowchart of FIG. 10, the CPU 41 determines whether or not printing has been concluded at step S130. The completion of printing depends upon determination of whether or not all the image data stored in the RAM 43 have already been output and processed. When printing has not yet been concluded, the CPU 41 carries out a sub-scan at step S140.

Figure 15:
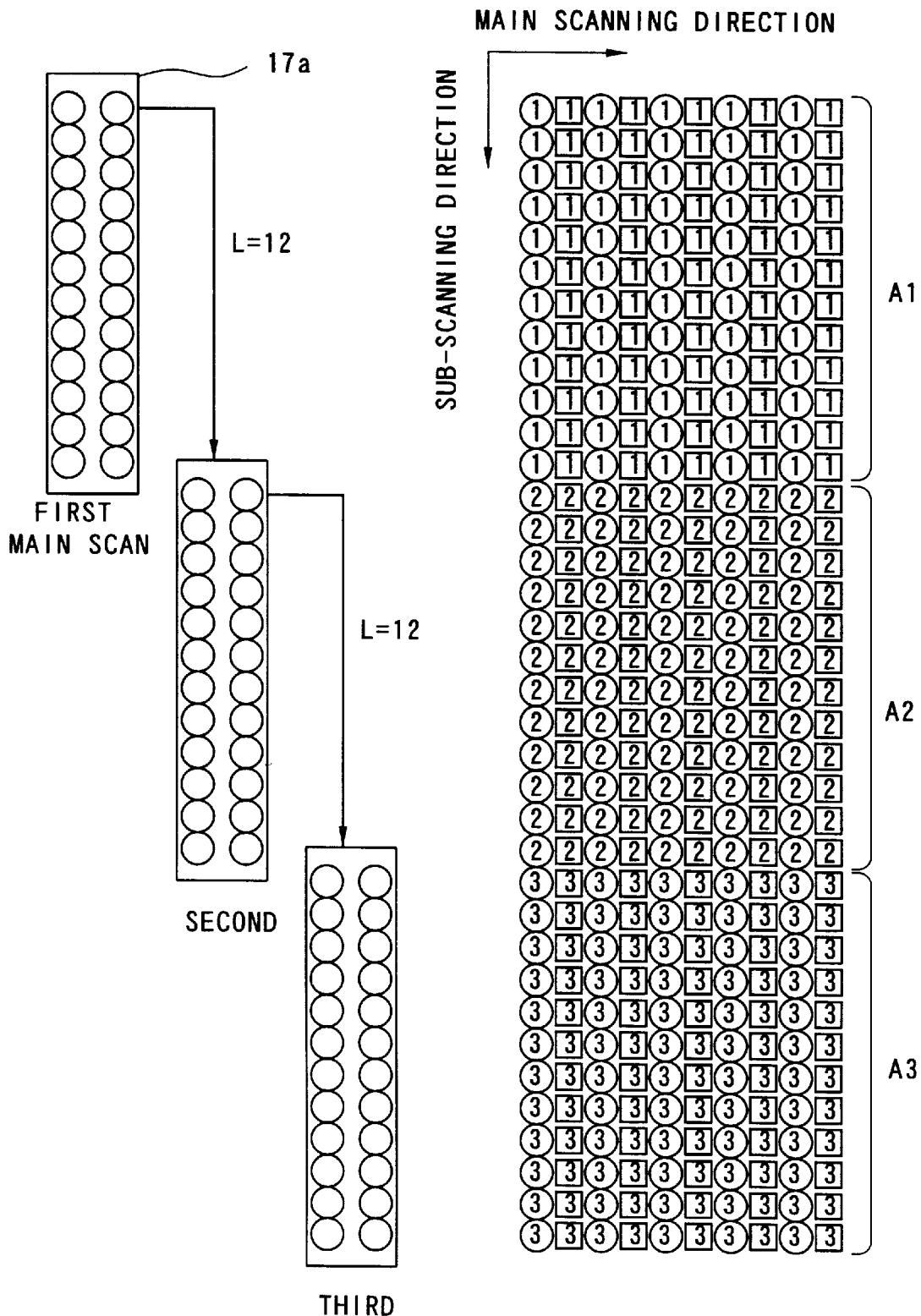
FIG. 15 shows a process of carrying out main scans and sub-scans to record dots in the first embodiment.

FIG. 15 shows a process of carrying out sub-scans to record dots. The left-side drawings of FIG. 15 show a variation in position of the print head 17a in the sub-scanning direction in the first, the second, and the third main scans. For the purpose of avoiding overlap of the drawings, the position of the print head 17a is also shifted in the lateral direction in FIG. 15. As a matter of convenience of illustration, the number of nozzles is reduced to twelve in each nozzle group, that is, the total of twenty four.

The right-side drawing of FIG. 15 shows dots formed in the respective main scans. The open circles denote dots formed by the nozzle group A, whereas the open squares denote dots formed by the nozzle group B. The numerals in the respective symbols represent the time of the main scan.

Every time when a main scan is carried out to form raster lines, a sub-scan of twelve dots is carried out as shown in FIG. 15. L=12 in FIG. 15 represents the feeding amount in sub-scan or the sub-scan feed amount. Namely the sub-scan is carried out by the amount corresponding to the number of nozzles included in each nozzle group. In the printer 22 of this embodiment, each nozzle group actually includes twenty-four nozzles, so that the sub-scan feed amount is equal to the pitch of twenty-four dots. The printer 22 repeatedly executes the main scan and the sub-scan described above to print a resulting image.

As shown in FIG. 15, the printer 22 of this embodiment creates each raster line in such a manner that dots formed by the nozzle group A and dots formed by the nozzle group B are arranged alternately and thereby prints a resulting image. Each raster line in the main scanning direction is always recorded by two different nozzles, that is, a nozzle included in the nozzle group A and another nozzle included in the nozzle group B. Even when a deviation of dot-forming positions occurs due to the distribution of the ink-spouting characteristics of the individual nozzles, this structure enables the deviation to be effectively dispersed on each raster line, thereby improving the picture quality of the resulting printed image. The printer 22 of this embodiment carries out printing upon condition that the number of repeated scans is set equal to one. Namely each raster line is formed by one main scan. This structure improves the picture quality of the resulting printed image without lowering the printing speed.

(3) Second Embodiment

Figure 16:
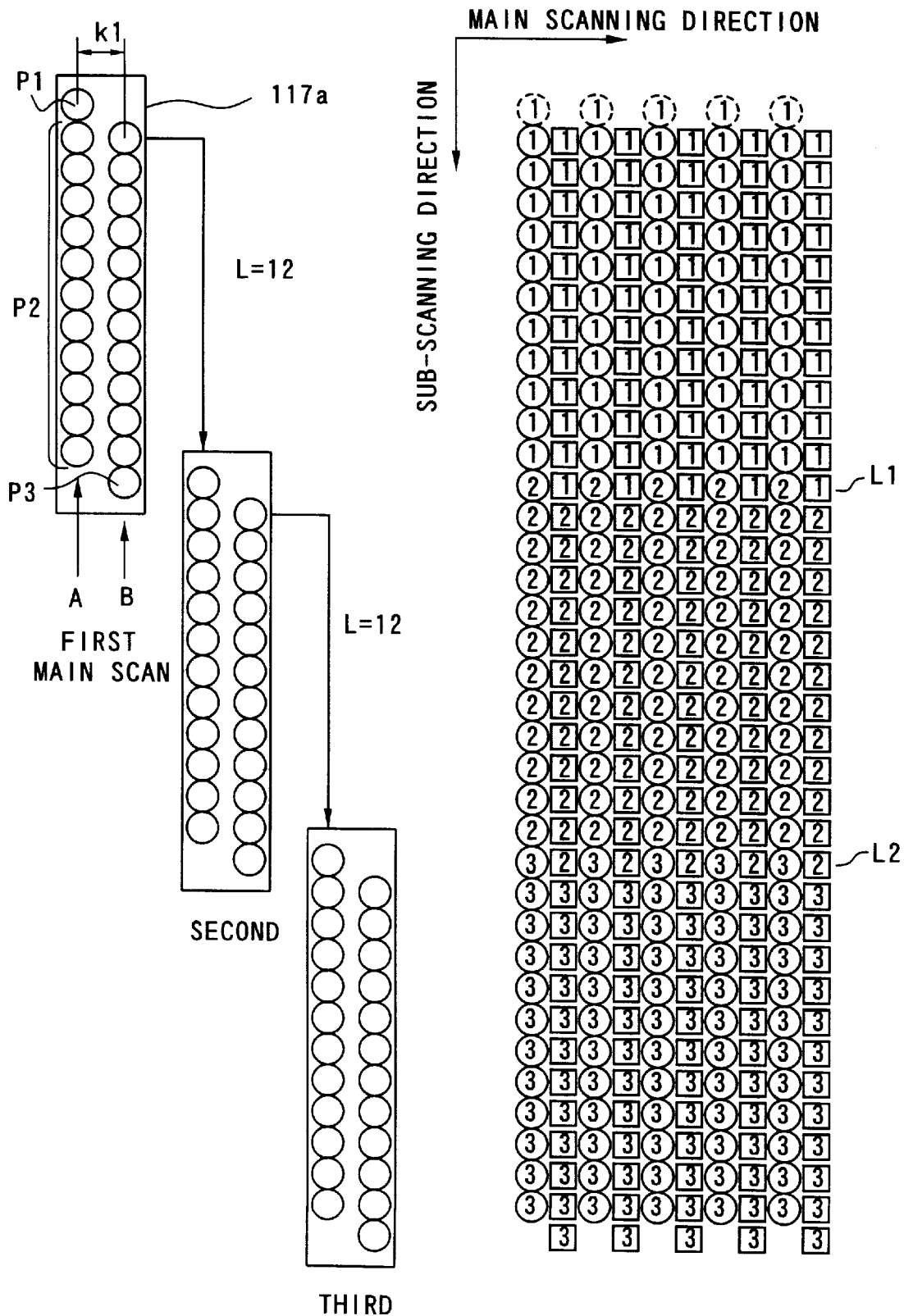
FIG. 16 shows a process of carrying out main scans and sub-scans to record dots in a second embodiment according to the present invention.

The following describes a second embodiment according to the present invention. In the second embodiment of the present invention, a print head 117a has a different structure from that of the print head 17a of the first embodiment. FIG. 16 illustrates nozzle groups mounted on the print head 117a of the second embodiment. Like the print head 17a of the first embodiment, the print head 117a of the second embodiment has nozzle groups A and B, wherein each nozzle group includes twenty-four nozzles arranged in alignment. The interval k1 between the respective nozzle groups A and B in the main scanning direction corresponds to the pitch of three dots. On the print head 117a of the second embodiment, the nozzle group A is shifted from the nozzle group B by one dot in the sub-scanning direction. As a matter of convenience of drawing, the number of nozzles included in each nozzle group is reduced to twelve in FIG. 16.

The second embodiment with the print head 117a carries out a print control routine that is similar to the flowchart of FIG. 10. When the print control routine is executed, dots are formed according to the process shown in FIGS. 11 through 14 with respect to a section P2 in FIG. 16, in which two nozzles are aligned in the main scanning direction. With respect to the remaining sections P1 and P3 in FIG. 16, in which two nozzles are not aligned in the main scanning direction, the dots formed are only those shown by the open circles or those shown by the open squares in FIGS. 11 through 14. By way of example, the first main scan forms only the dots shown by the open squares on a raster line L1 in FIG. 16.

When the sub-scan is carried out to form dots after the first main scan, the nozzle included in the section P1 forms dots shown by the open circles on the raster line L1 as illustrated in FIG. 16. The structure of the second embodiment with the print head 117a also enables an image to be printed without causing any problems. Although the nozzle group A is shifted from the nozzle group B by one dot in the sub-scanning direction in the structure of the second embodiment, the print head may have another arrangement in which the nozzle group A is largely shifted from the nozzle group B by an integral multiple of the pitch of pixels in the sub-scanning direction. This structure also enables an image to be printed in a similar manner.

As illustrated in FIG. 16, the printer 22 of the second embodiment also enables each raster line to be formed by different nozzles, thereby improving the picture quality of a resulting printed image. The structure of the second embodiment further causes the raster line L1 and L2 to be formed by a plurality of main scans, thus further improving the picture quality of the resulting printed image. In the structure of the first embodiment, there is no overlap of the image areas formed by the respective main scans (A1, A2, and A3 in FIG. 15). When there is an error in the sub-scan feed amount, a dropout of dots or a vacant space may exist between the respective image areas. In the printer 22 of the second embodiment, there are overlaps of the image areas formed by the respective main scans on the raster lines L1 and L2. Even when an error exists in the sub-scan feed amount, this structure disperses the error on the raster lines and thereby improves the picture quality of the resulting printed image.

(4) Third Embodiment

Figure 17:
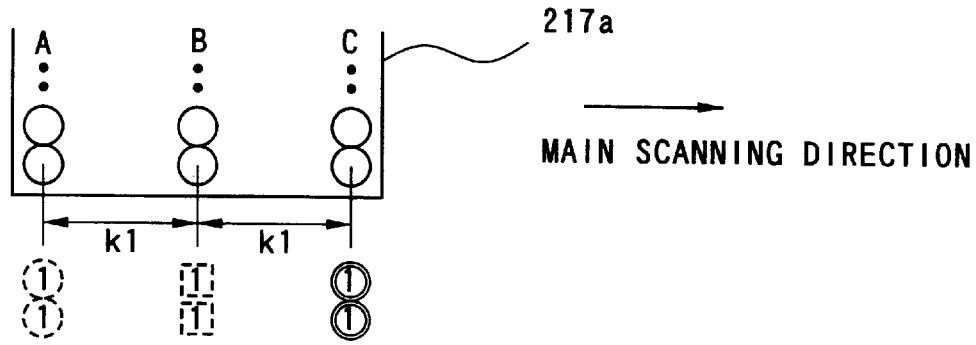
FIG. 17 illustrates the process of recording dots with a print head 217a of a third embodiment at a first timing.

The following describes a third embodiment according to the present invention. In the third embodiment of the present invention, a print head 217a has a different structure from that of the print head 17a of the first embodiment. FIG. 17 illustrates nozzle groups mounted on the print head 217a of the third embodiment. The print head 217a of the third embodiment has three nozzle groups (N1=3), that is, nozzle groups A, B, and C. The number of nozzles included in each nozzle group is twenty four. Both the interval between the nozzle groups A and B and the interval between the nozzle groups B and C are set four times the pitch of pixels (k1=4) to be prime to the number of nozzle groups N1=3. Another even number or an odd number, such as 5, may be set to these intervals.

FIGS. 17 through 20 show the process of recording dots with the print head 217a. FIG. 17 illustrates the process of recording dots at the time of starting dot formation. The open circles represent dots formed by the nozzle group A, the open squares represent dots formed by the nozzle group B, and the double circles represent dots formed by the nozzle group C. In the actual state, dots are formed only by the nozzle group C at the timing shown in FIG. 17. This is because there are no dots formed during main scans of the carriage 8 to be adjacent to the imaginary dots formed by the nozzle group A and the nozzle group B at the timing of FIG. 17.

Figure 18:
FIG. 18 illustrates the process of recording dots with the print head 217a of the third embodiment at a second timing.
Figure 18:

FIG. 18 illustrates the process of recording dots at the timing when the carriage 8 shifts rightward in the drawing by the pitch of three dots. In this embodiment, the moving rate of the print head 217a in the main scanning direction is set three times the pitch of pixels per recording time of one pixel (N1=3). Namely the respective nozzle groups are driven to record dots every time when the carriage 8 shifts by the pitch of three dots. The respective nozzle groups record dots at an identical timing. The shift of the carriage 8 coincides with the number of nozzle groups N1. The relationship between the shift of the carriage 8 in the process of recording dots and the number of nozzle groups N1 in the third embodiment is similar to that in the first embodiment. At the timing of FIG. 18, the nozzle group A does not form any dots.

Figure 19:
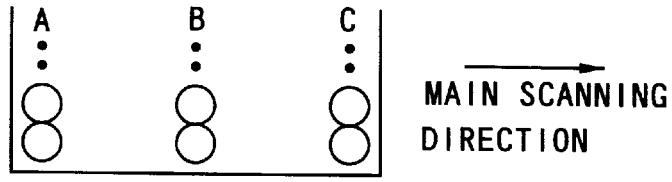
FIG. 19 illustrates the process of recording dots with the print head 217a of the third embodiment at a third timing.
Figure 19:
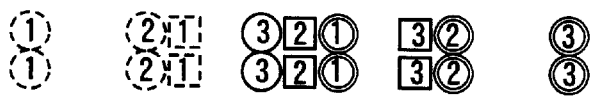
Figure 20:
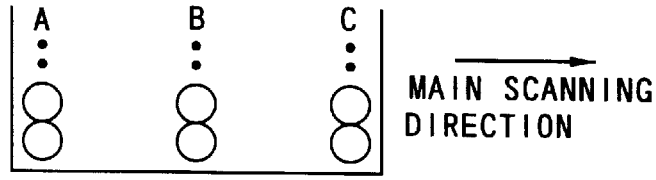
FIG. 20 illustrates the process of recording dots with the print head 217a of the third embodiment at a fourth timing.
Figure 20:

The carriage 8 further shifts by three dots and then by another three dots to record dots as shown in FIGS. 19 and 20. Every time when the carriage 8 shifts by three dots, the nozzle groups A through C are driven to form dots simultaneously. This structure enables dots to be formed without any dropout or overlap of dots in the main scanning direction as shown in FIG. 20. A sub-scan is carried out after each main scan as shown in FIG. 15. This procedure is repeated to create an image in a predetermined area.

In the printing system of the third embodiment, each raster line is formed by three different nozzles as shown in FIG. 20. This structure enables the deviation of the dot-forming positions due to a distribution of the characteristics of the individual nozzles to be effectively dispersed and thereby realizes the high quality printing.

In the printing system of the third embodiment, the positions of the respective nozzle groups may be shifted in the sub-scanning direction, like the example of FIG. 16. Although the structure of the third embodiment has the value '3' as the number of nozzle groups N1, the print head may have a greater number of nozzle groups.

(5) Fourth Embodiment

Figure 21:
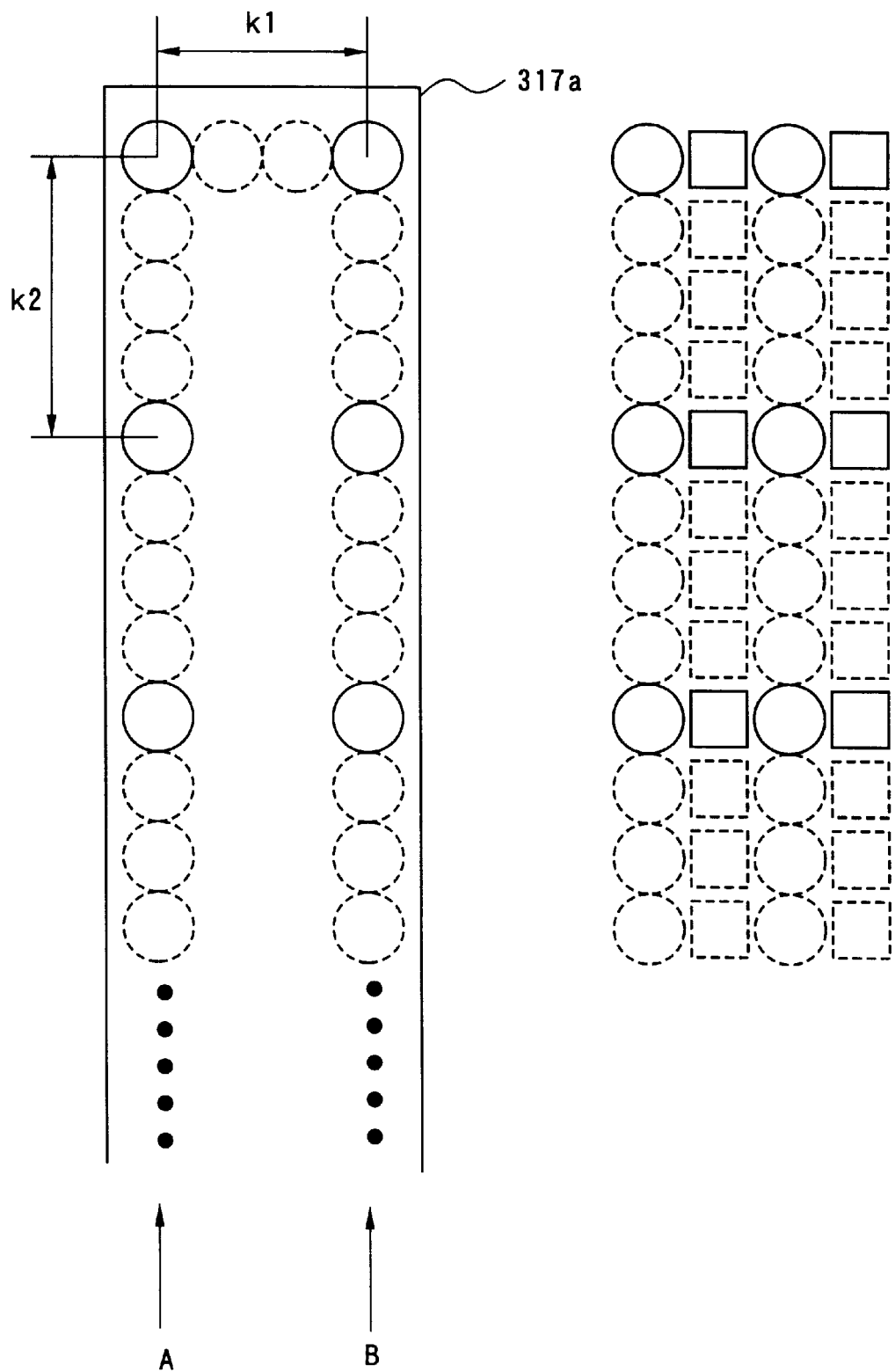
FIG. 21 shows an arrangement of nozzle groups on a print head 317a in a fourth embodiment according to the present invention.

The following describes a fourth embodiment according to the present invention. FIG. 21 shows an arrangement of nozzle groups mounted on a print head 317a in the fourth embodiment of the present invention. The print head 317a has two nozzle groups, that is, nozzle groups A and B. The interval k1 between the nozzle groups A and B in the main scanning direction is set equal to 3, which is prime to the number of nozzle groups N1=2. Unlike the nozzle groups shown in the first through the third embodiments, each nozzle group in the fourth embodiment includes nozzles that are arranged at predetermined intervals in the sub-scanning direction. A number of nozzles N2 included in each of the nozzle groups A and B is set to be prime to an interval k2 between adjacent nozzles in the sub-scanning direction expressed by the pitch of pixels in the sub-scanning direction as the unit. In the fourth embodiment, the number of nozzles N2 in each nozzle group is set equal to 23, and the interval k2 between adjacent nozzles in the sub-scanning direction is set four times the pitch of pixels (k2=4). A variety of other settings are allowed in the range that satisfies the above condition. The significance of the relationship between the number of nozzles N2 and the interval k2 in the sub-scanning direction will be described later.

The right-side drawing of FIG. 21 shows dots formed by the print head 317a. The open circles represent dots formed by the nozzle group A, whereas the open squares represent dots formed by the nozzle group B. The symbols shown by the broken line are only indication for clarifying the positional relationship of the respective dots. The positional relationship between the nozzle groups in the main scanning direction is identical with those in the first and the second embodiments. The nozzle groups thus form dots alternately to record each raster line as shown in FIG. 21. The moving rate of the print head 317a in the main scanning direction is three times the pitch of pixels per recording time of one pixel (N1=3) like the first and the second embodiments.

Figure 22:
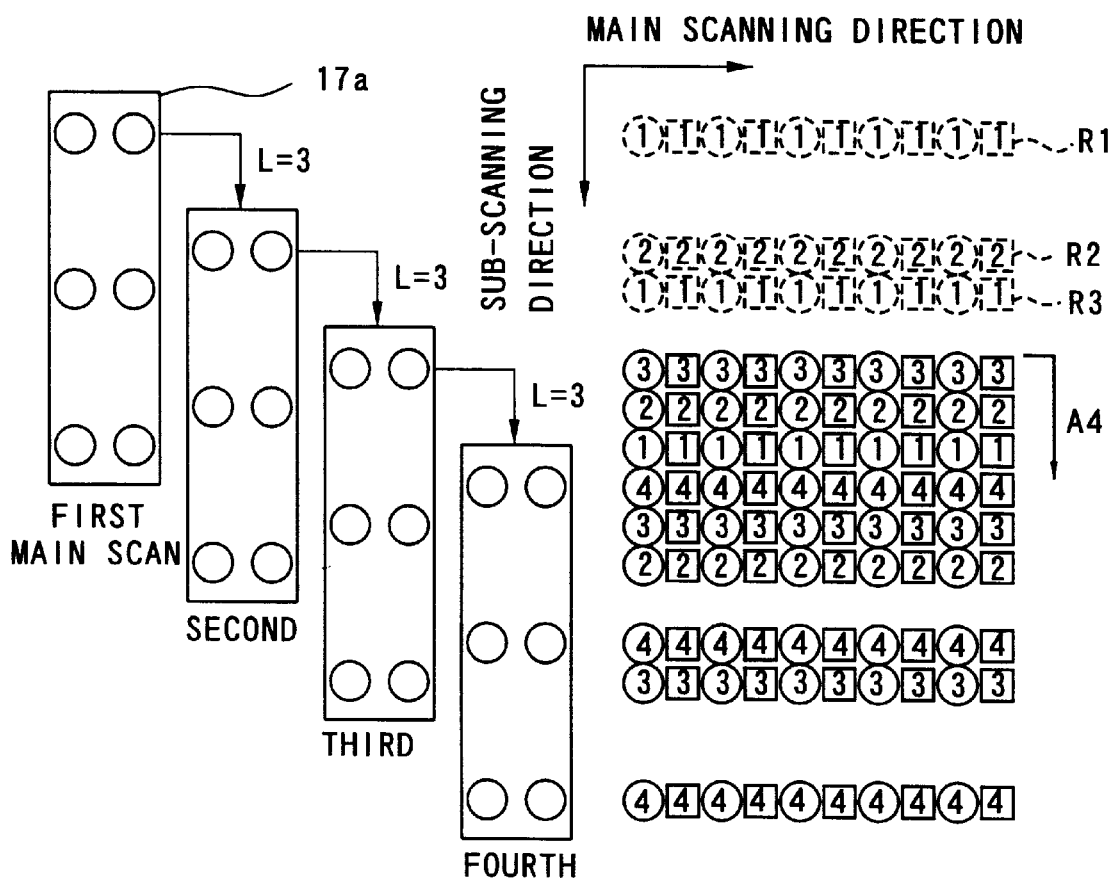
FIG. 22 shows a process of carrying out main scans and sub-scans to record dots in the forth embodiment.
Figure 23:
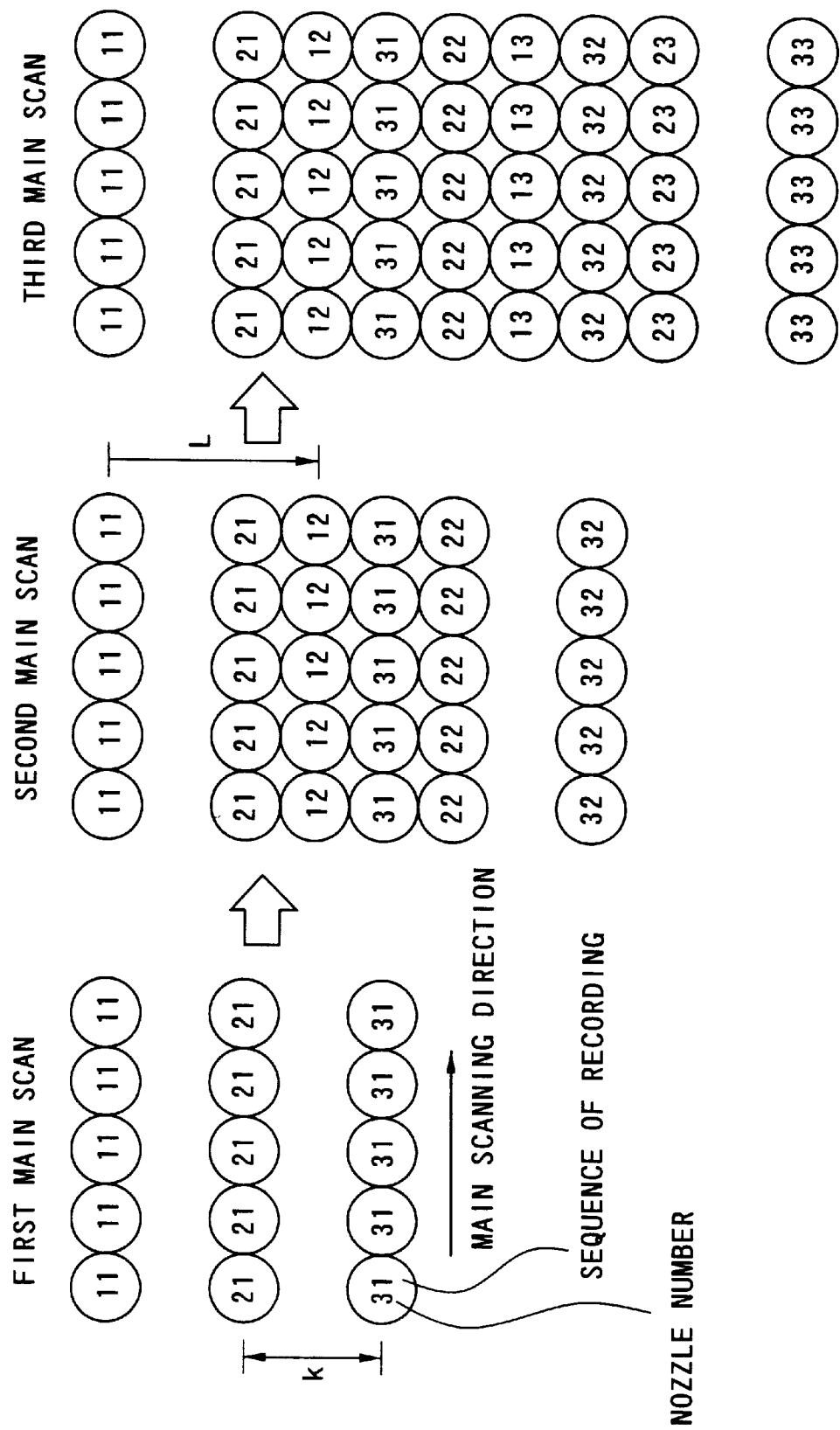
FIG. 23 shows a process of recording dots in the prior art interlace printing method.

A sub-scan is carried out after each main scan to record dots as shown in FIG. 22. The symbols used in FIG. 22 represent the same as those in FIG. 15. As a matter of convenience of illustration, it is assumed that each of the nozzle groups A and B has three nozzles in the sub-scanning direction. The shift of the print head 317a in the sub-scanning direction is N2 times the pitch of pixels in the sub-scanning direction. In the example of FIG. 22, the number of nozzles N2 in the sub-scanning direction is equal to three. Sub-scans are accordingly carried out by the amount of feed corresponding to the pitch of three dots. In the drawing of FIG. 22, L=3 represents the sub-scan feed amount.

The right-side drawing of FIG. 22 shows dots formed in the course of main scans and sub-scans. This structure enables an image to be printed without causing any dropout or overlap of dots in an area A4. Imaginary raster lines R1 through R3 do not have adjacent raster lines, so that the first and the second main scans do not form dots on these raster lines in the actual state. This recording process is realized by the relationship in which the number of nozzles N2 in the sub-scanning direction is prime to the interval k2 between adjacent nozzles in the sub-scanning direction. When the above condition is not fulfilled, a different nozzle may scan on the raster line that has already been recorded. This lowers the efficiency of printing. The number of nozzles N2 and the interval k2 in the sub-scanning direction may be set to any values in case that the efficiency of printing is neglected. In the example of FIG. 22, each nozzle group on the print head 317a has three nozzles in the sub-scanning direction. The similar printing process is realized by an arbitrary number of nozzles other than the twenty-three nozzles in the fourth embodiment.

In the printing system of the fourth embodiment, two different nozzles are driven to record dots on each raster line in the main scanning direction. This structure simultaneously realizes interlace printing. The structure of the fourth embodiment disperses the deviation of the dot-forming positions on each raster line and thereby improves the picture quality of a resulting recorded image. The structure also disperses the deviation of the dot-forming positions among different raster lines and further improves the picture quality of the resulting recorded image.

In the above embodiments, the respective nozzles form dots in different pixels. One possible modification of the structure forms a plurality of dots in the same pixel in an overlapping manner. This modified structure allows multi-tone expression of each pixel and thereby improves the picture quality of the resulting recorded image. This structure does not require an increase in number of main scans to create each raster line and thus does not lower the printing speed.

The present invention is not restricted to the above embodiments or their modifications, but there may be many other modifications, changes, and alterations without departing from the scope or spirit of the main characteristics of the present invention. For example, the above embodiments regard the color printers with six color inks. The principle of the present invention, however, does not depend upon the number of color inks, but is applicable to monochromatic printers. In the above printing systems, the CPU 41 of the printer 22 executes the print control process. The CPU in the computer 90 may alternatively execute the print control process.

It should be clearly understood that the above embodiments are only illustrative and not restrictive in any sense. The scope and spirit of the present invention are limited only by the terms of the appended claims.

What is claimed is:

1. A printing system comprising:
a plurality of print heads configured to reciprocate relative to a printing medium, and to form a raster line, which is a row of adjacent dots aligned in a main scanning direction, so as to print an image on said printing medium,
wherein said plurality of print heads include print heads for printing different colors and are positioned adjacent to each other in a main scanning direction, and
wherein each of said plurality of print heads comprises a first plurality of nozzles aligned in a sub-scanning direction, and a second plurality of nozzles aligned in a main scanning direction which simultaneously form an identical type of non-adjacent dots having an identical color on an identical raster line in a single pass of a main scan.

2. A printing system in accordance with claim 1, wherein said plurality of nozzles are arranged at a predetermined interval k1 in the main scanning direction, said predetermined interval being an integral multiple of a pitch of pixels in the main scanning direction.

3. A printing system in accordance with claim 1, said printing system further comprising:
a drive unit which controls actuation of said plurality of nozzles and causes said plurality of nozzles to record dots at different positions on said raster line.

4. A printing system in accordance with claim 3, wherein said plurality of nozzles are arranged to satisfy a relationship in which a predetermined interval k1 of said plurality of nozzles in the main scanning direction expressed as the pitch of pixels in the main scanning direction is prime to a number of said plurality of nozzles N1 aligned in the main scanning direction.

5. A printing system in accordance with claim 4, wherein said drive unit drives said plurality of nozzles simultaneously at a specific timing to record dots in every N1-th pixel in the main scanning direction.

6. A printing system in accordance with claim 1, wherein said print head comprises plural sets of said plurality of nozzles, said plural sets being arranged at a given interval in a predetermined direction crossing the main scanning direction, said given interval being an integral multiple k2 of a pitch of pixels in the predetermined direction.

7. A printing system in accordance with claim 6, wherein said print head comprises said plural sets of said plurality of nozzles that are arranged to satisfy a relationship in which the integral multiple k2 and a number of plural sets N2 are prime to each other.

8. A printing system in accordance with claim 7, said printing system further comprising:
a sub-scanning unit that carries out a sub-scan, which shifts said printing medium relative to said print head by a predetermined amount of feed in a sub-scanning direction or in the predetermined direction crossing the main scanning direction every time when one raster line is formed, said predetermined amount of feed is said number N2 times the pitch of pixels in the sub-scanning direction.

9. A printing method comprising:
reciprocating a plurality of print heads relative to a printing medium to form a raster line, which is a row of adjacent dots aligned in a main scanning direction, so as to print an image on said printing medium,
wherein said plurality of print heads include print heads for printing different colors and are positioned adjacent to each other in a main scanning direction, and
wherein each of said plurality of print heads comprises a first plurality of nozzles aligned in a sub-scanning direction, and a second plurality of nozzles aligned in the main scanning direction which simultaneously form an identical type of non-adjacent dots on an identical raster line in a single pass of main scan and are arranged to satisfy a relationship in which a predetermined interval k1 of said second plurality of nozzles in the main scanning direction expressed as a pitch of pixels in the main scanning direction is prime to a number of said second plurality of nozzles N1 aligned in the main scanning direction,
said method further comprising the steps of:
(a) driving said plurality of print heads in the main scanning direction; and
(b) driving said second plurality of nozzles on respective print heads simultaneously at a specific timing to record dots having an identical color in every N1-th pixel in the main scanning direction.

* * * * *